United States Patent
Anand et al.

(10) Patent No.: US 7,247,012 B2
(45) Date of Patent: Jul. 24, 2007

(54) ROTATABLE HEAD FOR FORMING SPIRAL EXTRUSIONS

(75) Inventors: Prem Anand, Waterloo (CA); John C. Giardina, New Port Richey, FL (US)

(73) Assignee: Cangen Holdings, Inc., Chamblee, GA (US)

( * ) Notice: Subject to any disclaimer, the term of this patent is extended or adjusted under 35 U.S.C. 154(b) by 390 days.

(21) Appl. No.: 10/849,340

(22) Filed: May 19, 2004

(65) Prior Publication Data

US 2005/0260408 A1 Nov. 24, 2005

(51) Int. Cl.
B29C 47/04 (2006.01)
B29C 47/24 (2006.01)

(52) U.S. Cl. ................ 425/131.1; 425/381; 425/382.3; 425/462

(58) Field of Classification Search ............. 425/131.1, 425/381, 382.3, 462
See application file for complete search history.

(56) References Cited

U.S. PATENT DOCUMENTS 2,191,829 A * 2/1940 Johnson ................... 425/131.1
2,779,970 A * 2/1957 Stocker .................... 425/131.1
3,642,396 A * 2/1972 Meneidis .................... 425/381
4,548,567 A * 10/1985 Missout ...................... 425/381
2005/0006804 A1* 1/2005 Hartman .................. 425/382.3

* cited by examiner

*Primary Examiner*—Robert Davis
*Assistant Examiner*—Joseph Leyson
(74) *Attorney, Agent, or Firm*—Jaeckle Fleischmann & Mugel, LLP

(57) ABSTRACT

A polymer extrusion crosshead assembly for forming a spirally-striped extrusion. The assembly includes conventional components for admitting, turning, and accelerating primary molten polymer toward a novel rotating die sub-assembly. A body element includes an axial counterbore for receiving a manifold supply block in communication with a source of secondary striping polymer. A wear plate is attached to the manifold block. The die sub-assembly includes a striping die having an annular passage for conveying the primary polymer to form an extruded tube or a core material coating. The die is loaded against the wear plate by a Belleville washer. The die includes one or more striping nozzles in communication with the manifold block for injecting secondary striping polymer into the annular stream of primary polymer flowing through the die, creating a longitudinal stripe of striping polymer. Rotating the die while extruding both polymers yields a helically striped (spiral) extrusion.

14 Claims, 2 Drawing Sheets

US 7,247,012 B2

ROTATABLE HEAD FOR FORMING SPIRAL EXTRUSIONS

TECHNICAL FIELD

The present invention relates to apparatus for extrusion forming of molten polymer material; more particularly, to crossline extrusion heads for continuous extrusion coating of hollow or solid shapes; and most particularly, to an extrusion crosshead having a rotatable secondary die for forming a spiral stripe in a cylindrical extrusion.

BACKGROUND OF THE INVENTION

Extrusion heads for continuous extrusion forming of continuous plastic elements having specific cross-sectional shapes are well known. Such extruded elements may include, for example, pipes, rods, moldings, tubings, and the like.

In a typical prior art extrusion system, solid pellets of the thermoplastic material to be used are fed into a progressive-screw extruder wherein the pellets are liquefied under high pressure and are injected into an extrusion head. Such injection may be made axially of the extrusion head, known in the art as "inline," or at an angle, typically 90°, to the axis of the head, known in the art as "crosshead." Except when coating highly flexible core materials such as wire, the coating of a sheath layer onto a core stock requires passing the core stock axially through a die and injecting the molten polymer into the die head in a crosshead relationship.

In a typical prior art extrusion crosshead, a generally cylindrical body element concentrically surrounds a generally cylindrical mandrel, a first annular flow space being provided therebetween. Molten polymer injected orthogonally from a screw extruder enters an annular reservoir provided in either the body element or mandrel and then flows from the reservoir along the annular flow space. Contiguous with the annular flow space is a conical flow space, formed between a conical choke ring and a conical portion of the mandrel, wherein the diameter of annular flow is decreased and the velocity of flow is increased. Downstream of the conical flow space is a second annular flow space formed between a second cylindrical region of the extruder body and a second cylindrical region of the mandrel. This flow space leads into a flow shaping region formed between an extrusion die and an extrusion tip, from whence the formed shape is extruded.

When it is desired to form a coating on a core element, the mandrel and extrusion tip are provided with an axial passage through which the core element is passed as extrusion proceeds.

When it is desired to provide a spiral element in a coating, the extrusion die may be made rotatable of the extrusion body.

Several problems exist in prior art extrusion heads having rotatable dies.

First, it has been found to be difficult to provide a rotatable seal to prevent leakage of molten polymer from the head between the stationary and rotating components. Typically, such leakage causes continuous polymer buildup on the outside of the head, eventually requiring shutdown of the process to clean and restart.

Second, polymer may leak into the bearings, causing failure of the head.

Third, the extrusion die and tip must be heated externally to prevent freeze-up at the start of operation.

SUMMARY OF THE INVENTION

Briefly described, a polymer extrusion crosshead in accordance with the invention includes conventional components as described above for admitting, turning, and accelerating molten polymer toward a novel rotating die assembly.

An annular reservoir is provided for receiving primary molten polymer from a supply means such as a progressive screw extruder. A first generally cylindrical body section concentrically surrounds a generally cylindrical mandrel, a first annular flow space being provided therebetween. Primary molten polymer injected from a screw extruder enters an annular reservoir provided in either the body section or mandrel. Contiguous with the annular flow space is a conical flow space, formed between a conical choke ring and a conical portion of the mandrel, wherein the diameter of annular flow is decreased. Extending from the mandrel is an extrusion tip having a male conical portion and cylindrical portion. A second body section includes a similar female conical portion and a counterbore for receiving a striping supply block in communication with a source of secondary striping polymer, through which the male cylindrical portion extends. A wear plate is attached to the manifold block.

Coaxially disposed on the distal end of the second body section is a rotatable striping die sub-assembly including a striping die. The striping die has a central annular passage for annularly conveying the primary polymer to form an extruded tube, if compressed air is passed through the mandrel and extrusion tip, or a coated jacket, if core material is passed therethrough. The striping die also includes a striping nozzle in communication with passages in the manifold block, through the wear plate, for injecting secondary striping polymer into the annular stream of primary polymer flowing through the die, creating a longitudinal stripe therein of striping polymer. By causing the die sub-assembly to rotate the die against the wear plate while extruding both the annular primary polymer and the striping secondary polymer, a helically striped (spiral) extrusion is formed. Obviously, multiple stripes may be extruded simultaneously by providing a plurality of striping nozzles surrounding the central die aperture, each nozzle being in communication with the manifold block.

To create high seal force of the rotating die against the wear plate, the die is dynamically loaded axially against the plate by a Belleville washer compressed within the sub-assembly. The bearings are disposed behind the drive flange of the sub-assembly hub such that they are protected from contamination by any polymer that may leak from the interface between the wear plate and the rotatable die. Further, progressive relaxation of the Belleville washer assures a continuing load on the wear surface, permitting extended extrusion runs uninterrupted by loss of seal pressure.

Preferably, a band heater is mounted on the second body section for pre-heating the manifold block, wear plate, and die before extrusion is begun.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
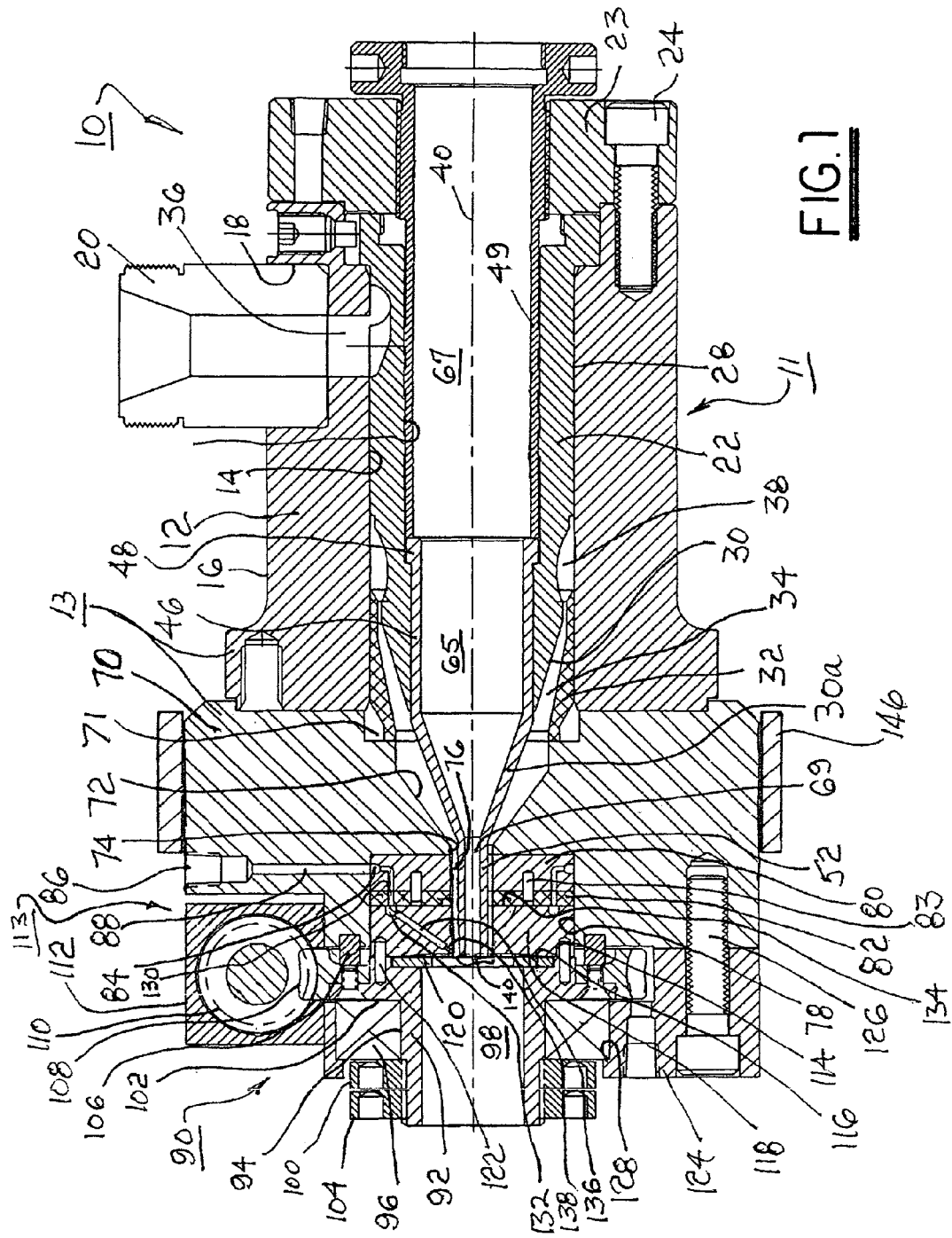
FIG. 1 is an elevational cross-sectional view of a rotatable head assembly for forming spiral extrusions in accordance with the invention.
Figure 2:
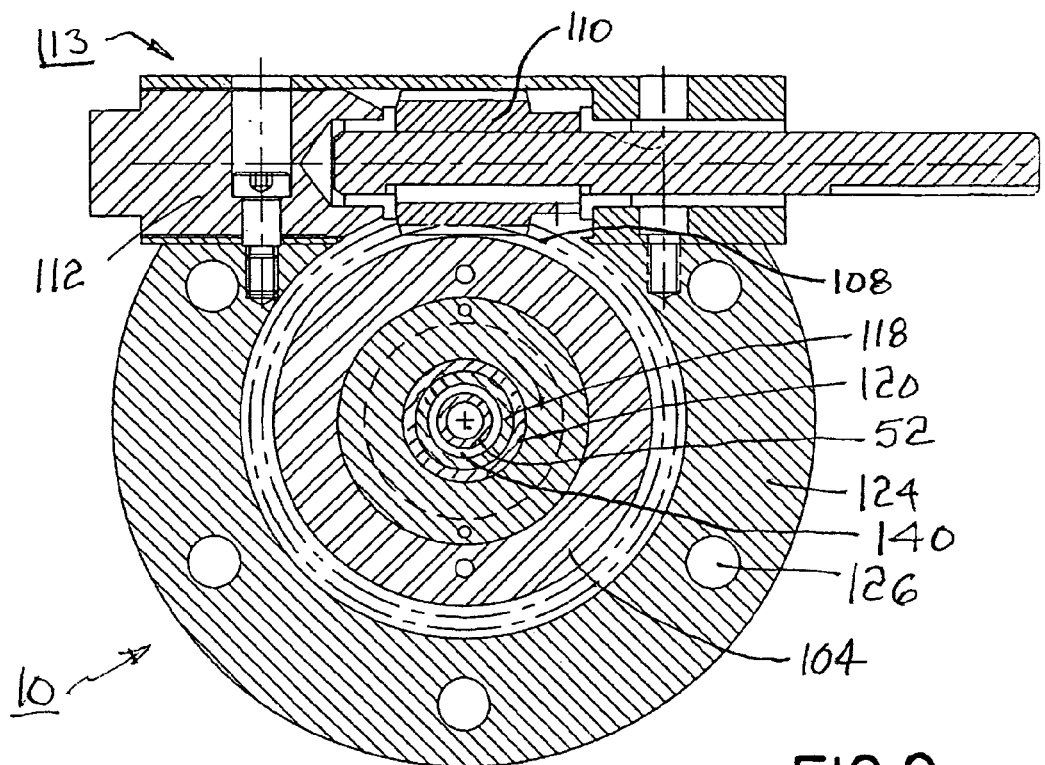
FIG. 2 is an exit end view of the head assembly shown in FIG. 1.

Referring to FIGS. 1 and 2, there is shown an exemplary embodiment 10 of an improved extrusion crosshead assembly in accordance with the invention. Embodiment 10 comprises a prior art front end portion for providing a flow of primary polymer to be extruded, and a novel rotatable die sub-assembly for providing one or more stripes of a secondary polymer in the primary polymer extrusion.

A first body section 12 of a body element 13 is substantially cylindrical on an inner surface 14 and outer surface 16 thereof. A radial bore 18 therein is receivable of supply means 20 for providing a primary molten polymer to assembly 10 in use thereof. A mandrel 22 is disposed within body section 12 and secured therein via ring 23 and bolts 24. Mandrel 22 includes a cylindrical outer surface portion 28 that is close-fitting to inner body surface 14 and a tapered portion 30. A conically tapered insert 32 cooperates with tapered portion 30 to define a decreasive annular flow space 34. A radial passage 36 in first body section 12 connects bore 18 with an annular reservoir 38 formed in portion 28 for receiving molten primary polymer into the head assembly. By means of reservoir 38 and flow space 34, polymer flow through head assembly 10 is converted from columnar flow orthogonal to assembly axis 40 to annular flow through space 34.

Disposed coaxially and snugly within mandrel 22 is an extrusion tip 46 which extends beyond mandrel tapered portion 30, having its own portion 30a tapered at substantially the same taper angle to continue annular flow space 34. Tip 46 includes an annular mounting flange 48. A cylindrical sleeve 49 secures tip 46 to mandrel 22, sleeve 49 being threadedly received in ring 23. The mandrel, tip, and sleeve are carefully related such that extrusion tip 46 may be withdrawn and replaced, as may be desired, via removal of sleeve 49, without requiring any other changes to the overall apparatus.

A cylindrical portion 52 of extrusion tip 46 extends from tapered portion 32a. Extrusion tip 46 is provided with a stepped axial bore 65 throughout, mated with a bore 67 in sleeve 49. The narrowest portion 69 of bore 65 has a diameter selected for snug but slidable support of core material to be spiral coated, as may be desired.

Second body section 70 of body element 13 is coaxially mounted to first body section 12 and includes a first counterbore 71 for receiving and retaining conically tapered insert 32. Immediately adjacent counterbore 71 is a conically tapered entry 72 for cooperating with tip tapered portion 30a in choking flow of primary polymer therebetween in known fashion. Tapered entry 72 terminates in a cylindrical bore 74 that cooperates with tip portion 52 in forming an annular space 76 for flow of primary polymer. Second body section 70 is further provided with a second counterbore 78, and a manifold block 80 and wear plate 82 are disposed therein. Manifold block 80 is pressed into the counterbore, and wear plate 82 is removably pinned to block 80 by recessed pins 83. Preferably, wear plate 82 is formed of a dry-lubricating, low-friction material, for example, bronze or a polymer, for example, a polyimide polymer such as Torlon or Rulon.

Manifold block 80 includes an annular groove 84 in communication with a supply means 86 of a secondary molten polymer via passage 88 in second body section 70. The secondary polymer may have characteristics different from the primary polymer, such as a different color.

A rotatable die sub-assembly 90 is coaxially disposed in counterbore 78. Sub-assembly 90 includes a hub 92 having a cylindrical outer surface 94 for receiving bearings assembly 96, preferably ball or roller bearings, and an axial bore 98 for passage of elements extruded from assembly 10. A loading nut 100 is received on a threaded portion of surface 94 for axially loading the bearing assembly against hub flange 102, and a locking nut 104 secures loading nut 100. A resilient rotary seal 106 is disposed in an annular groove in second body section 70.

Hub flange 102 is a toothed periphery 108 for cooperating with a conventional worm gear 110 driven by controlled drive element 112 of an actuation assembly 113 to cause hub 92 to rotate at a desired speed, in known fashion.

Hub 92 is further provided with an axial face 114 and a shallow counterbore 116. A striping die 118 is disposed between face 114 and wear plate 82 and is urged against wear plate 82 by spring means disposed in counterbore 116, preferably a Belleville washer 120. Die 118 is pinned to hub 92 via axial pins 122 such that the pins cause the die to rotate with the hub but also allow the die to advance axially along the pins in response to force from the Belleville washer as the wear plate diminishes in axial dimension through use of the apparatus. Thus an effective seal is maintained against leakage of polymer between the die and the wear plate over extensive wear of the wear plate.

Die sub-assembly 90 is secured in place via an outer ring 124 bolted via bolts 126 to second body section 70. A lip 128 on ring 124 captures the bearing assembly 96 and hence the entire sub-assembly 90 and provides a thrust surface for compression of Belleville washer 120 via the bearing races and the hub.

Secondary striping polymer is supplied as follows. From annular groove 84 in manifold block 80, a plurality of passages 130 extend through the manifold block and through wear plate 82, ending at a second annular distribution passage 132 formed in axial face 134 of die 118 (groove 132 may be formed in the mating face of the wear plate, as may be desired, to equal effect). A supply passage 136 extends diagonally through the die to connect with a nozzle outlet 138 which enters passage 76 for primary polymer near the distal end thereof. Striping polymer is thus injected by nozzle outlet 138 as a stripe into the primary polymer flowing through passage 76. Die 118 is provided with an appropriately-shaped outlet orifice 140, and the primary and secondary polymer streams are extruded therefrom together. As the striping polymer is supplied into the die in an annular passage 132, a plurality of stripes may be provided by providing additional passages 136 and nozzle outlets 138 arranged angularly as desired about cylindrical passage 76.

Figure 3:
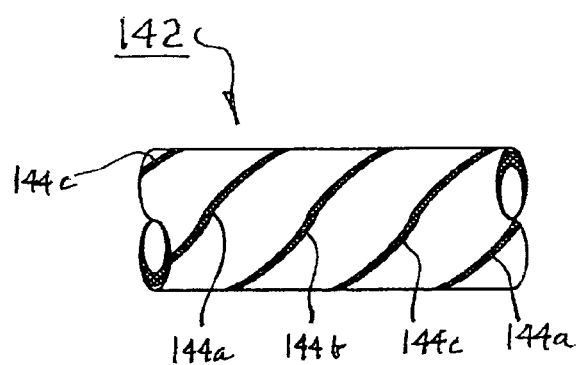
FIG. 3 is an isometric view of a spirally-striped element formed by apparatus in accordance with the invention.

When worm gear 110 is not rotated, the stripe or stripes will simply be longitudinal of the extrusion. However, when drive element 112 is energized to drive gear 110, die 118 is rotated axially about the primary polymer flow, resulting in a helically or spirally striped extrusion. Referring to FIG. 3, a tubular extrusion 142 having three stripes 144a,144b,144c may be formed by apparatus in accordance with the invention, such as assembly 10. The extrusion is made tubular by supplying air during extruding operation through axial passages 65,67,69 to keep the polymeric tube inflated after extrusion from die 118 until the polymer is solidified. Alternatively, core materials such as wires, rods, other tubes, lumber, and the like may be conveyed through those axial passages in known fashion and coated with either linear or spirally striped extrusion. Of course, by closing portion 52 of extrusion tip 46 in known fashion, a rod (not shown) may be extruded having a linear or spiral stripe in its outer surface.

Preferably, second body section 70 is surrounded by a band heater 146 for heating section 70, manifold block 80, wear plate 82, and die 118 to a suitable temperature prior to introducing molten polymer into head assembly 10.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An extrusion head assembly for continuous extrusion of a primary molten polymer in a predetermined shape and a secondary molten polymer in a stripe inserted into said predetermined shape, the primary and secondary molten polymers being supplied from first and second sources, comprising:
   a) a fixed member for conveying said primary molten polymer in an annular stream axially of an axis of said head assembly, said fixed member including a body element;
   b) a manifold block disposed against said body element, said manifold block including a distribution channel for receiving and distributing said secondary polymer;
   c) a wear plate disposed against said manifold block; and
   d) a die sub-assembly rotatably disposed on said body element for receiving said annular stream of primary molten polymer from said fixed member and extruding said predetermined shape, said die sub-assembly including an extrusion die in contact with said wear plate and having an opening for extruding said predetermined shape and having means for communicating with said distribution channel to receive said secondary polymer therefrom to form said inserted stripe, said sub-assembly further including means for rotating said die about said axis,
   wherein said sub-assembly includes spring means for axially loading said extrusion die against said wear plate.

2. An extrusion head assembly in accordance with claim 1 wherein said fixed member includes a mandrel disposed in said body element and supporting an extrusion tip.

3. An extrusion head assembly in accordance with claim 2 wherein said mandrel and said extrusion tip have axial passages therethrough.

4. An extrusion head assembly in accordance with claim 1 wherein said spring means includes a Belleville washer.

5. An extrusion head assembly in accordance with claim 1 wherein said wear plate is formed from a dry-lubricating, low-friction material.

6. An extrusion head assembly in accordance with claim 5 wherein said material is selected from the group consisting of bronze and a polymer.

7. An extrusion head assembly in accordance with claim 1 wherein said means for rotating includes a worm gear.

8. An extrusion head assembly in accordance with claim 1 wherein said body element includes a counterbore, and wherein said manifold plate, wear plate, and die are disposed in said counterbore.

9. An extrusion head assembly in accordance with claim 1 wherein said die sub-assembly further includes a hub for engaging said means for rotation and for supporting said die.

10. An extrusion head assembly in accordance with claim 9 wherein said die is mounted on pins to be axially slidable of said hub.

11. An extrusion head assembly in accordance with claim 1 wherein said means for rotating further comprises bearings for rotatably supporting said die sub-assembly on said body element.

12. An extrusion head assembly in accordance with claim 11 wherein said bearings include a ball bearing assembly.

13. An extrusion head assembly in accordance with claim 1 wherein said means for communicating with said distribution channel in said manifold block include an annular secondary polymer distribution channel in said one of said wear plate and said die, at least one nozzle outlet, and a channel connecting said secondary polymer distribution channel to said nozzle outlet.

14. An extrusion head assembly in accordance with claim 13 comprising a plurality of said connecting channels and said nozzle outlets in communication with said annular secondary polymer distribution channel.

* * * * *